(12) United States Patent
Bauer

(10) Patent No.: US 8,453,423 B2
(45) Date of Patent: Jun. 4, 2013

(54) MANUAL ROUND HAY BALE WRAPPER

(76) Inventor: Gary Paul Bauer, Mason, MI (US)

( * ) Notice: Subject to any disclaimer, the term of this patent is extended or adjusted under 35 U.S.C. 154(b) by 216 days.

(21) Appl. No.: 12/788,227

(22) Filed: May 26, 2010

(65) Prior Publication Data

US 2011/0197548 A1 Aug. 18, 2011

Related U.S. Application Data

(60) Provisional application No. 61/181,908, filed on May 28, 2009.

(51) Int. Cl.
*B65B 11/02* (2006.01)

(52) U.S. Cl.
USPC .............................................. 53/588; 53/210

(58) Field of Classification Search
USPC ... 53/556, 588, 203, 210, 218, 219; 414/24.5, 414/24.6
IPC ............. A01D 87/12; A01F 15/07; B65B 11/02
See application file for complete search history.

(56) References Cited

U.S. PATENT DOCUMENTS

| | | | | |
|---|---|---|---|---|
| 2,467,286 A * | 4/1949 | Young et al. | | 53/203 |
| 2,841,202 A * | 7/1958 | Hirschy | | 156/426 |
| 2,945,336 A * | 7/1960 | Anderson et al. | | 53/588 |
| 4,117,650 A * | 10/1978 | Ito et al. | | 53/587 |
| 4,120,405 A * | 10/1978 | Jones et al. | | 414/24.5 |
| 4,275,985 A * | 6/1981 | Schremmer | | 414/24.5 |
| 4,545,182 A * | 10/1985 | McDowell, Jr. | | 53/556 |
| 4,658,570 A * | 4/1987 | Thomas | | 53/556 |
| 4,712,354 A * | 12/1987 | Lancaster et al. | | 53/588 |
| 4,854,809 A * | 8/1989 | Rhodes | | 414/24.5 |
| 5,012,631 A * | 5/1991 | Hostetler et al. | | 53/588 |
| 5,152,125 A * | 10/1992 | Laver | | 53/588 |
| 5,352,080 A * | 10/1994 | Bakke | | 414/24.5 |
| 5,404,691 A * | 4/1995 | Scherer | | 53/588 |
| 5,673,542 A * | 10/1997 | Vartanian et al. | | 53/556 |
| 5,807,053 A * | 9/1998 | Pride | | 414/24.5 |
| 7,516,694 B1 * | 4/2009 | Eifler | | 53/588 |
| 2002/0062630 A1 * | 5/2002 | Gutche | | 53/556 |
| 2002/0189210 A1 * | 12/2002 | Wiley | | 53/556 |

FOREIGN PATENT DOCUMENTS

WO          WO 9307059 A1 *   4/1993  ................... 53/588

* cited by examiner

*Primary Examiner* — Stephen F Gerrity
(74) *Attorney, Agent, or Firm* — Singh Law Firm, PLLC; Gautam B. Singh

(57) ABSTRACT

This is a machine to allow a single individual to manually wrap round hay bales with any type of film or net wrap. It allows the operator to position a round bale suspended on a bale spear and centered within the bale wrap ring to turn the ring which contains the wrap material clockwise or counter-clockwise about the bale as the wrap covers the bale about its circumference. The ring can also be moved left and right to ensure full coverage of the bale in spite of widths and the ring is large enough to accommodate bales of any diameter up to six foot and can be easily adapted to bales of even larger diameter if round balers are produced in excess of six foot in diameter.

13 Claims, 2 Drawing Sheets

MANUAL ROUND HAY BALE WRAPPER

The inventor hereby claims the benefits associated with the Provisional Patent applied for on 28 May 2009, Application No. 61/181,908, Name of Inventor—Gary Paul Bauer

DESCRIPTION OF THE MANUAL BALE WRAP MACHINE

The machine consists of a base on which all other components rest. The base is a ladder frame sufficient to carry the weight of the entire apparatus and it rests upon the ground or other level surface. The frame has affixed to its upper surface, four wheels mounted and aligned in the direction of the frame so that a trolley which rests above it is supported by those four wheels which are captured within a "U" channel. The "U" channel is the bottom part of the frame for the dolly. At each end of the "U" channel, stops are welded limiting travel so that the trolley does not run beyond the "U" channel. Those wheels and the channel allow the trolley to move laterally to accommodate bales of varying widths. The trolley is also built as a ladder frame which rests atop the base with "U" channel as described above. Cross members are attached and four pillow blocks are mounted in alignment with the cross members. The pillow blocks support a shaft which is free to rotate and connects one pillow block to the pillow block on the opposite cross member so that there are two complete axle assemblies atop the cross members and each axle supports the ring above allowing it to rotate. To the interior of the pillow block and immediately adjacent to it is a flat disk which is used to capture and retain the ring which rides atop the two axles. To the interior of each disk is a wheel designed to provide a smooth cushioned and low resistance surface for the large ring above to turn. The third and final component is the large ring of sufficient size to accommodate bales of any diameter. The rings are constructed in such a manner as to be easily disassembled to minimize storage and allow it to be easily transported when broken down. There are two large rings joined at the points where the ring is easily disassembled with cross members giving the rings a parallel and rigid conformation. The cross members are tubular and have spring clips locking the sections onto the cross brace. The cross brace could also be secured with bolts or the entire ring could be welded and function in the same fashion. Once the rings have been assembled with the cross braces, the entire unit can then be placed atop the axles and prepared for the wrapping material. The wrapping material is attached to the inside of the large rings with one roll at opposite locations. The brackets welded to the interior of the ring contain holes which align with nylon fittings designed to seat within the inner core of the wrapping material roll and allow the operator to select the tension appropriate for the material being wrapped by tightening a fitting which increases rolling tension as the fitting is advanced.

Once the bale is moved into position, the operator then tucks the plastic wrap into the twine or other bale wrapping material and turns the ring in a clockwise or counterclockwise manner until the bale has been completely covered with one wrap the width of the roll of wrapping material and moving the ring laterally left or right to continue coverage until the entire bale is covered.

The machine is designed so that it can accommodate a motorized unit later on should the operator desire. In addition, This unit will have an attachment arm which will allow the operator to enter the frame for bale wrap precision.

BRIEF DESCRIPTION OF DRAWINGS

"FIG. 1 A" is an exploded view of one of the cross bars, joints and spring clips which are utilized to secure the cross bar and ring segments.

BACKGROUND OF THE INVENTION

There are many bale wrapping machines currently available; however, most of them rotate the bale around while the wrapping material remains fixed in place. This requires significant mechanical advantage to operate those machines and exposes the operator to the hazards of the electric or hydraulic motors which may pinch or bind the operator during the operation of those machines exposing the manufacturer to possible liability. In addition, the cost of producing a machine which turns the bale which often weighs well over a thousand pounds requires significant expense of production to include the mechanics to turn the bale.

BRIEF SUMMARY OF THE INVENTION

This unit is designed to rotate the wrapping material and the bale remains stationary supported by a bale spear attached to the front or rear of a tractor. Bale spears are in common use and normally found incident to the production, transport and feeding operations associated with round bales. The cost of production of hay continues to rise with increased input costs making it more important than ever to preserve as much of the hay and the quality of the hay whenever possible. This unit can be manufactured at a cost which makes it affordable for hobby farmers as well as full time farm operators. The cost to wrap a bale using this method currently runs about $1 per bale for the wrapping material and the final product will be better preserved than net wrap or twine. In addition, this method of preservation would allow an operator to seal the bales against one another to create high moisture hay for ruminants. This method of preservation would prevent many of the losses associated with traditional methods of preservation which allow contact with moisture in the ground degrading a significant amount of the bale closest to the ground.

This invention eliminates the high cost of producing a machine which is heavy enough with the necessary mechanical advantage necessary to rotate the bale by the operator. In addition, it contains fewer parts and is less expensive to acquire making it affordable for the small to medium farming operations. Most of it is manufactured from readily accessible components from many farm stores allowing the operator to make repairs without specialized tools or parts.

Finally, this system is efficient, can be used by any operator without tools or mechanical expertise and will prove to be a very inexpensive way to improve their hay production and preservation.

DETAILED DESCRIPTION OF THE MACHINE

Figure 1:
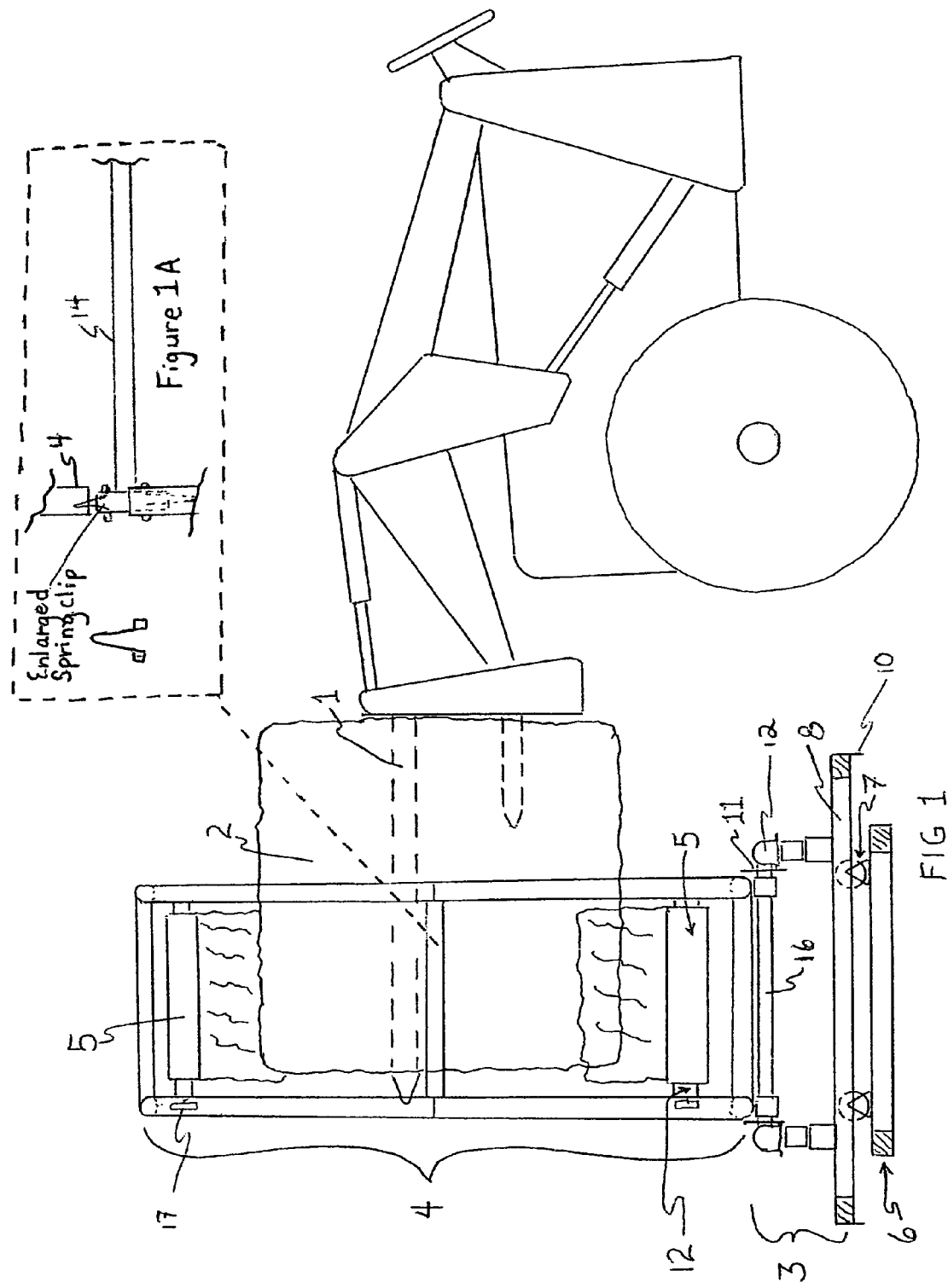
"FIG. 1" is a drawing of the entire round bale wrapping apparatus viewed from the side with the depiction of a tractor/loader to the immediate right of the apparatus with a spear inserted into a round hay bale supported by that tractor. The distal end of the round hay bale is inserted into the center of the apparatus midway across the bale with the proximal end of the bale remaining outside of the apparatus in this drawing.

FIG. 1 Shows the machine from the side and a tractor with a spear (1) attached to a tractor front-end loader and a bale (2) suspended by that spear. The tractor is stationary and the bale is suspended over the trolley unit (3) and centered within the ring (4) which is free to rotate about the bale (in that picture the wrap (5) is tucked into the twine encircling the bale and started in a counterclockwise manner, but also could be rotated clockwise). The supporting base (6) has four wheels (7) mounted on the top of the base and captured in the lower "U" channels (8) [also depicted in FIG. 2] which comprise the lower frame unit of the trolley unit allowing the trolley to travel freely across the width of the bale until the trolley reaches the stops (10) attached to the end of the "U" channels (8). In this manner the entire ring can be moved toward or away from the tractor to allow coverage of the entire width of the bale. The ring is segmented with four segments (14) on each side and connected by four bars with cross segments at each end forming an "H" pattern (one of the four is shown enlarged in FIG. 1 Inset A) which are designed to fit into each segment with spring clips (15) or bolts securing each segment to the other three segments and also connection the two rings so that they comprise a single unit. The diameter of the ring can be eight feet which is sufficient to accommodate bales of four to six feet in diameter, but could be increased in the event bales exceed those measurements in the future.

Figure 2:
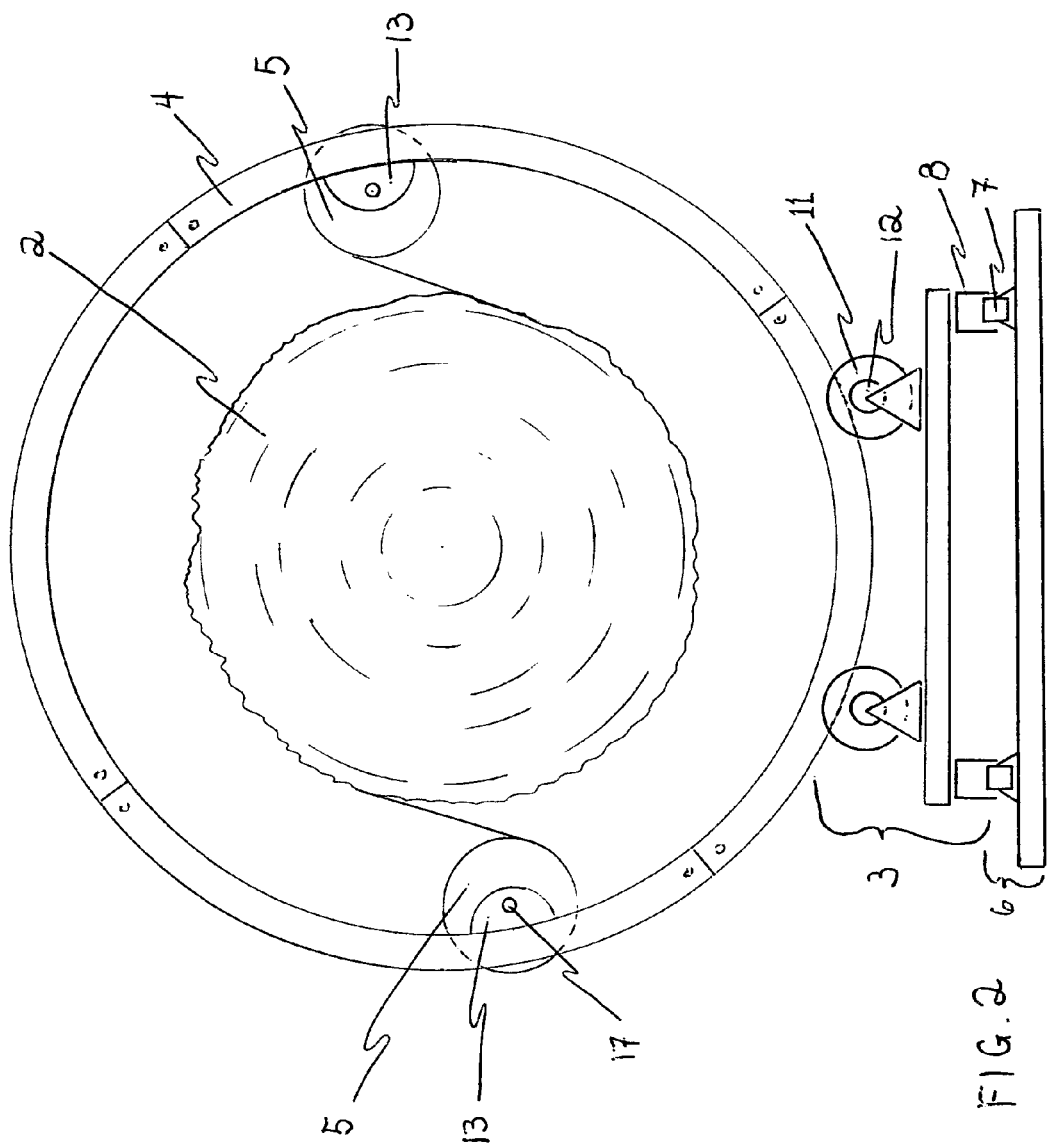
"FIG. 2" is a view of the entire apparatus rotated 90 degrees from the view in FIG. 1. the bale is seen from the distal end of the bale centered within the ring and the wrapping material being applied from the two rolls attached to the ring.

FIG. 2 Shows the bale wrap machine viewed from the front of the machine illustrating the "U" channel (8) which captures the wheels (7) positioned under the trolley. What I have omitted in that FIG. 2 are the stops (10) located at the end of each "U" channel (visible in FIG. 1) and limiting the movement beyond the ends of each channel. You can also see the disks (11) located adjacent to the roller bearings (12) connected to the opposite roller bearing by a shaft (16) with the ring resting on top of the surface of the two parallel shafts. The roller bearings are captured in pillow blocks attached to the upper surface of the trolley unit (3). This allows free movement of the ring in a clockwise or counterclockwise fashion. The disks which are immediately adjacent to the rollers capture the ring and prevent it from moving laterally off the rollers. The ends of the shafts on which the ring rests are not depicted with but can be equipped with hex shafts to accommodate a power drill or variable speed motor to turn the shaft with mechanical assistance or it can be operated manually by the rotation of the ring pulling it downward toward the operator causing the ring to rotate clockwise or counterclockwise. The wrapping material (5) is pictured from the ends of the rolls in FIG. 2 and from the side of the rolls in FIG. 1. In FIG. 1, the film wrap is being applied in a clockwise manner and in FIG. 2 it be being applied in a counterclockwise manner demonstrating the ability to wrap in either direction at the option of the operator. The bale wrap material (5) is suspended within the ring apparatus supported by four tabs (13) affixed to the interior of the ring the axis of the bale wrap material rotating about the hole drilled into that tab and further supported by a shaft with supporting caps which fit into the ends of the wrap tube connected the tabs with threaded ends (17) allowing a nut to be tightened to create resistance in the rotation of the wrap as the nut is tightened.

I claim:

1. A portable wrapping apparatus for round agricultural bales comprising:
   a baling unit including
      a first circular ring shaped structure defining a first plane where the first circular ring is formed with a plurality of arc structures adapted to fasten with each other and form the first circular ring,
      a second circular ring shaped structure defining a second plane where the second circular ring is formed with a plurality of arc structures adapted to fasten with each other and form the second circular ring,
      a plurality of linear cross bars each having a first and a second end, where
         the first end of each of the plurality of cross bars is fixedly attached to the first circular ring, and the second end of each of the plurality of cross bars is fixedly attached to the second circular ring where
            the angle of attachment of the plurality of cross bars and circular rings is adapted to maintain the first plane and the second plane in a configuration parallel to each other;
   a plurality of wrap dispensing units attached to the baling unit where each wrap dispensing unit includes
      a wrap roller rod having
         a first end,
         a mid-section adapted to include a roll of wrapping material thereupon, and
         a second end,
      a first tab fastened upon the first circular ring wherein the first tab includes a first hole therein adapted to receive the first end of the wrap roller rod,
      a second tab fastened upon the second circular ring wherein the second tab includes a second hole therein adapted to receive the second end of the wrap roller rod,
      where upon inserting the first end into the first hole and the second end into the second hole the wrap roller rod is perpendicular to the first plane and perpendicular to the second plane of the baling unit;
   a trolly unit including
      a support base equipped with a plurality of wheels attached thereupon,
      a base plate having a top and a bottom surface,
      a plurality of linearly disposed guide-rails each having two ends fixedly attached to the bottom surface of the base plate where
         each of the plurality of guide-rails is complementarily adapted to accommodate the plurality of wheels and enable the wheels to freely glide therein, and
         each of the ends having an end stop adapted to prevent the plurality of wheels from gliding therethrough thereby restricting movement of the attached base plate,
      a plurality of pairs of roller bearings fixedly attached to the top surface of the base plate where each of the plurality of roller bearings is adapted to engage and allow rotational movements of the first circular ring and the second circular ring thereupon where
         each of the pair of roller bearings is connected with a shaft,
      where the baling unit is adapted to rest upon and rotate over the plurality of shafts and the rotation of the baling unit unwraps the wrapping material from the wrap dispensing units.

2. The apparatus of claim 1 having a first pair and a second pair of wheels removably mounted on the support base and adapted to engage a first and a second guide rail to enable the trolley unit to move in a direction that is parallel to the guide rails.

3. The apparatus of claim 1, wherein the first and the second ring sections are each assembled using circular arcs detachably fastened using snap on clips.

4. The apparatus of claim 3 where the first and the second ring sections are each assembled using four sections.

5. The apparatus of claim 1, wherein the cross bars are removably fastened to the first and second ring sections.

6. The apparatus of claim 1, wherein the cross bars are welded to the first and second ring sections.

7. The apparatus of claim 1, wherein the cross bars include spring clips to removably connect the first and second ring sections.

8. The apparatus of claim 1 further adapted to receive an object to be wrapped communicated to the baling unit by mounting the object on a bale spear.

9. The apparatus of claim 8 adapted to receive the object mounted on a bale spear where the bale spear is mounted on a farming vehicle.

10. The apparatus of claim 1 which includes two wrap dispensing units.

11. The apparatus of claim 1, wherein the first end and the second end of the wrap roller rod are each threaded and adapted to receive a nut.

12. The apparatus of claim 1, further comprising a tensioning device mounted to the wrap roller rod.

13. The apparatus of claim 1, wherein each roller bearing is flanged by a disk adapted to restrict lateral movement of baling unit.

* * * * *